United States Patent
Mangalari et al.

(10) Patent No.: US 12,285,868 B1
(45) Date of Patent: Apr. 29, 2025

(54) SYSTEMS AND METHODS FOR IDENTIFYING OVERLAPS VIA ROBOTIC PROCESS AUTOMATION (RPA)

(71) Applicant: United Services Automobile Association (USAA), San Antonio, TX (US)

(72) Inventors: Pradeep R. Mangalari, Naperville, IL (US); Dustin Bitter, Lehi, UT (US); Gregory Meyer, San Antonio, TX (US); Christopher Russell, The Colony, TX (US); Jeanie Graciela Lopez, San Antonio, TX (US); Carol Lyn Lawrence, Fair Oaks Ranch, TX (US); Timothy Benjamin Czerlinsky, Dallas, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 494 days.

(21) Appl. No.: 17/668,998

(22) Filed: Feb. 10, 2022

(51) Int. Cl.
   *B25J 9/16* (2006.01)

(52) U.S. Cl.
   CPC .................. *B25J 9/1661* (2013.01)

(58) Field of Classification Search
   CPC ........................................... B25J 9/1661
   See application file for complete search history.

(56) References Cited

U.S. PATENT DOCUMENTS

| | | | |
|---|---|---|---|
| 2020/0206920 A1* | 7/2020 | Ma | G06Q 10/0633 |
| 2022/0147386 A1* | 5/2022 | Goyal | G06F 9/4881 |
| 2022/0355473 A1* | 11/2022 | Mircea | G06F 11/3696 |
| 2023/0037297 A1* | 2/2023 | Parasuraman | G06F 9/451 |
| 2023/0259386 A1* | 8/2023 | Yue | H04L 63/20 726/1 |
| 2023/0289389 A1* | 9/2023 | Leedekerken | G06F 16/9532 |

\* cited by examiner

*Primary Examiner* — Sisley N Kim
(74) *Attorney, Agent, or Firm* — Fletcher Yoder, P.C.

(57) ABSTRACT

Overlapping functions called in robotic process automation scripts may be used to create new efficiencies in an IT infrastructure. For example, the overlaps may be used to identify code modification impact in the IT infrastructure, may be used to remediate duplication of coding efforts across silos in an organization, and may be merged to create new efficiencies in code/script storage and/or sustaining efforts.

19 Claims, 6 Drawing Sheets

SYSTEMS AND METHODS FOR IDENTIFYING OVERLAPS VIA ROBOTIC PROCESS AUTOMATION (RPA)

BACKGROUND

The present disclosure relates generally to systems and methods for using robotic process automation to identify and/or restructure overlapping product areas and/or code.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Business organizations often have a number of product offerings that may make use of similar functionality across different areas of the organization. Unfortunately, as these organizations grow, they may become more "siloed", having different sub-organizations that are relatively independent from one another. From an Information Technology perspective, this may cause many inefficiencies. For example, developers in different siloed sub-organizations may perform duplicative work, developing code that has a functional equivalent of other code developed in another silo. This may become quite burdensome over time, as additional code bloat may cause inefficient code storage. Further, the duplicative efforts may be an inefficient use of highly expensive workforce resources. Additionally, when vulnerability safeguards and/or bug-fixes for the functionality is applied in one silo, there is no guarantee that the same safeguards and/or fixes will be applied to the functionality in the other silo. Therefore, it would be beneficial to improve traditional IT techniques to avoid such development overlap, when possible.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems and methods are provided herein to identify and/or restructure overlapping development in an IT infrastructure. To do this, robotic process automation (RPA) scripts are generated and compared against one another to identify overlapping functions called within the RPA scripts. Alerts may be triggered to apprise developers or other IT administrators of the overlapping code. Additionally, this identification of overlaps may be used to minimize RPA scripts, by creating scripts that minimize inefficient navigation to get to a common overlapping task of a more-efficient (e.g., less navigational step) RPA script. Further, in some embodiments, code can be restructured to cause one copy of the overlapping code to be used across two or more codebases, reducing the overlapping code to one copy.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
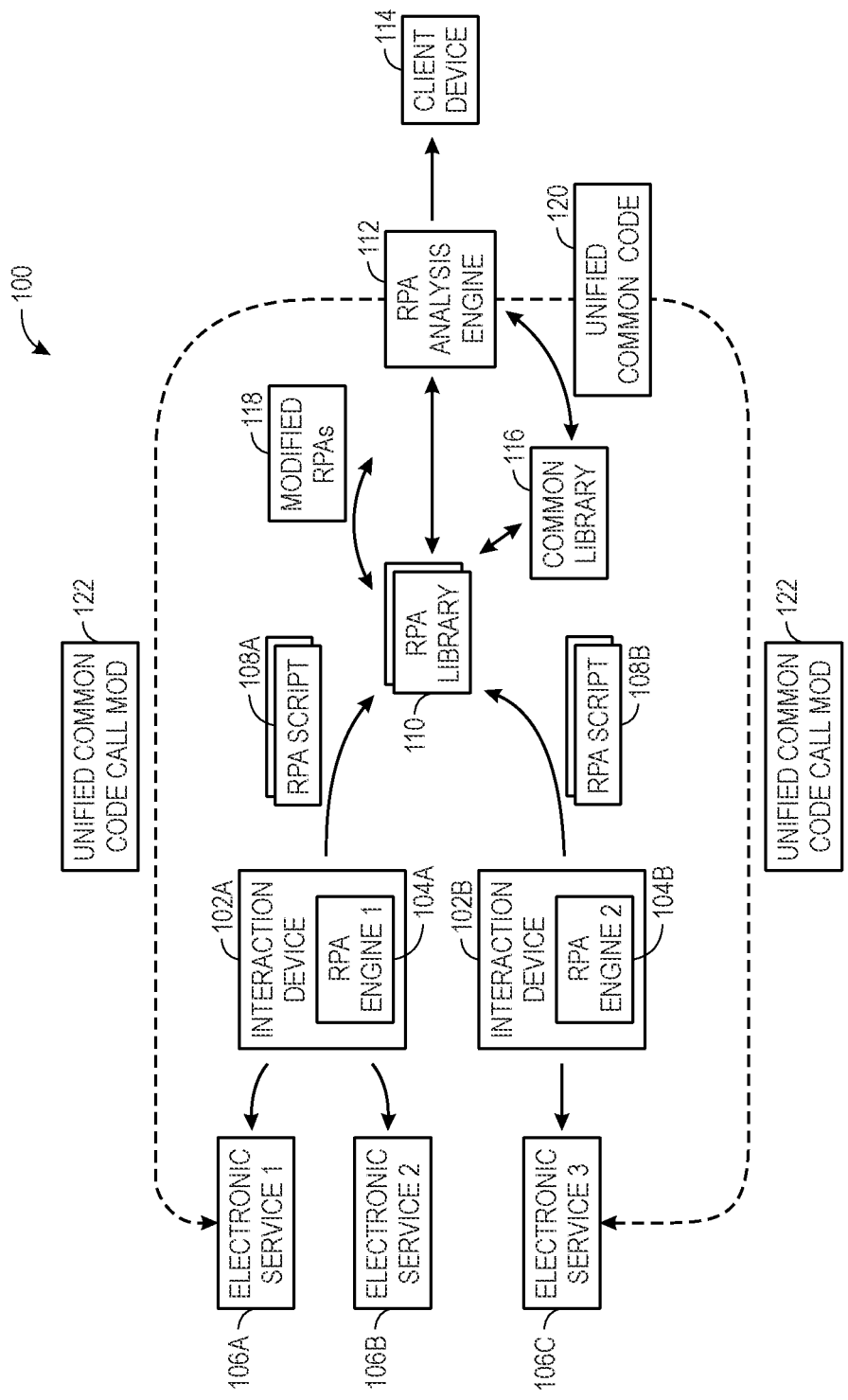
FIG. 1 is a system for implementing overlapping development identification and/or restructuring using robotic process automation (RPA) and/or machine learning (ML), in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and organization-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein the term "server" may refer to a computing device that may handle a large number of concurrent transactions (e.g., billions of transactions per day), such as mainframes produced by IBM®, Hitachi®, Unisys® Corporation, and so on, that run operating systems such as Linux®, z/OS®, Unix®, and the like. As used herein, "cloud" and "cloud services" may include computing services provided via cloud infrastructure such as Microsoft® Azure® Amazon® Web Services (AWS), Google® Cloud Platform (GCP), and the like.

An organization (e.g., insurance provider, financial services provider) may process large transactions during operations, such as debits, credits, banking transactions, insurance transactions, database queries, web-based transactions, and so on. The organization may utilize a number of developers to develop products/services that utilize code functionality to provide a desired output. Unfortunately, over time, developers may become unaware of the actions of other developers (e.g., due to lack of communication, siloed sub-organizations, rapid code-expansion, etc.) which may create a multitude of inefficiencies from an information technology (IT) perspective. For one, duplicative development efforts may lead to inefficient resource utilization/spend. For example, multiple developers may develop code that provides virtually the same functionality. These increased codebases may cause inefficient storage of code, as multiple copies of code that provide similar functionality may be stored. Further, generating multiple codebases that perform similar tasks may lead to vulnerability issues and/or increased exposure to bugs in the code, as vulnerability safeguards and/or bug fixes may be applied to one codebase but not the others. Further, in some instances, when there are many navigational paths to a common (overlapping) functionality, it may be important to understand these navigational paths and how changes to the navigation and/or common functionality may impact each of these paths. Accordingly, it would be beneficial to predict overflow capacity and to fine tune the external systems for the predicted overflow so as to more efficiently process the various transactions. However, manually monitoring transactions loads, then manually tuning the external systems for expected overloads may be time-consuming and inaccurate. Instead, transaction loads may be monitored using robotic process automation and tuning may also be performed using robotic process automation.

As used herein, robotic process automation includes a set of software tools (e.g., software robot) that monitors certain transactions via a user interface of a client device. These transactions are typically used to create scripts that automate repetitive transactions. However, the current techniques use RPA scripts in a new, non-traditional way, to identify overlapping functionality between scripts to identify efficiencies for an IT infrastructure.

The robotic process automation tools may record transactional interactions with electronic services. Non-limiting examples of the transactions include webpage access, usage of certain objects (e.g., command buttons, dropdowns, radio buttons) associated with the electronic service, length of path to access a target feature on a website, time periods at which the software application is accessed, time analytics for completing tasks via the software application, and frequency that particular tasks are completed. The length of path indicates the number of clicks or steps taken to access the target feature or perform an action. For example, an IT user may directly access a report summary of current transactions by clicking a summary tab on the home page of website. The client may also access the summary of the account via a longer path, such as selecting the following tabs in order: a settings tab, an accounts tab, and a summary tab. Such client interaction may be stored and transmitted to the quality assurance system as robotic process automation scripts. As used herein, robotic process automation scripts are sequences of code written to perform a single task or a series of tasks based on the client interaction. There may be a shorter path available.

With the preceding in mind, the following figures relate to various types of generalized system architectures or configurations that may be employed to provide services to an organization to increase IT infrastructure efficiency using RPA script analysis.

Turning now to FIG. 1, a system 100 for implementing overlapping development identification and/or restructuring using robotic process automation (RPA) and/or machine learning (ML), in accordance with aspects of the present disclosure is provided. Interaction devices 102 (e.g., 102A and 102B) include RPA engines 104 (e.g., 104A and 104B) that record interactions made by the interaction devices 102 on electronic services 106 (e.g., 106A, 106B, and 106C). As interactions are detected, these interactions are recorded in an RPA script 108 (e.g., 108A and 108B) that may be stored in an RPA data store, such as an RPA library 110.

The system 100 includes an RPA analysis engine 112. As will be discussed in detail below, the RPA analysis engine 112 may access the RPA scripts 108 and compare the RPA scripts 108 against each other to identify commonalities/overlaps in use of particular functions of electronic services 106. As will be discussed the overlapping functionality may be used in many ways to improve efficiency of an IT infrastructure. For example, when multiple paths (e.g., interaction steps) lead to one or more overlapping functions in a set of RPA scripts, this may indicate one path is more efficient than another at reaching the overlapping functionality. In such a case, a notification of this more-efficient path may be provided to a client device 114, which in some instances may be a particular one of the interaction devices 102 that utilized the less-efficient path. In this manner, an interactor that used the less-efficient path to reach the overlapping functionality may be apprised of the more-efficient path. In some embodiments, the interactor may be provided a visual representation of the more-efficient path, via playback of the RPA with the more-efficient path that is adapted with the parameters of the interactor that previously used the less-efficient path.

In some embodiments, the IT infrastructure may be made more efficient by moving the overlapping sequence of functions found by the RPA analysis engine 112 from the individual RPA scripts 108 to a common library 116. The RPA scripts 108 using the moved overlapping sequence may be modified (e.g., modified RPA scripts 118) with a pointer to the moved sequence in the RPA library 110, resulting in one version of the overlapping sequence in the common library rather than a copy of the overlapping sequence in each RPA script 108 that uses the overlapping sequence. In this manner, the RPA scripts 108 may be more-efficiently stored, as multiple copies of the overlapping sequence are not maintained in the RPA library, thus reducing storage requirements of the RPA scripts 108. Further, if the overlapping sequence changes (e.g., steps in the sequence are added, removed, or modified), the modification need only be made in the common library 116, rather than at each RPA script 108 that uses the overlapping sequence.

In some embodiments, the underlying code of the electronic services 106 may be more-efficiently implemented based upon the overlapping sequences found. For example, when overlapping sequences are found in interaction with multiple electronic services 106, the underlying codebase facilitating these transactions may be moved from the individual codebases of the electronic services 106 facilitating these transactions into a unified common code 120, which may be stored in the common library 116. The codebases of the electronic services may be modified to remove the individual codebases facilitating these transactions and to replace these codebases with a pointer 122 to the unified common code 120. In this manner, one common codebase subset for facilitating the overlapping interactions may be stored for multiple electronic services. This may result in more efficient management, sustainment, etc. of the codebase facilitating the interactions and may also reduce an amount of storage required to store the electronic services 106.

Figure 2:
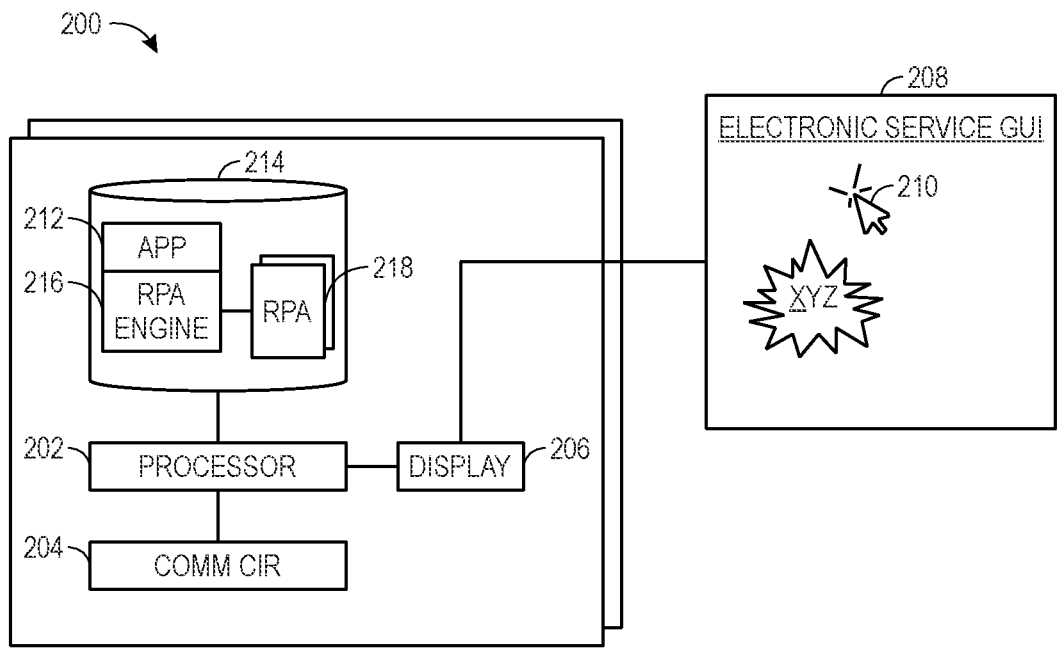
FIG. 2 is a block diagram, illustrating an electronic interacting device that is used to generate RPA scripts for subsequent overlap analysis, in accordance with aspects of the present disclosure.
Figure 3:
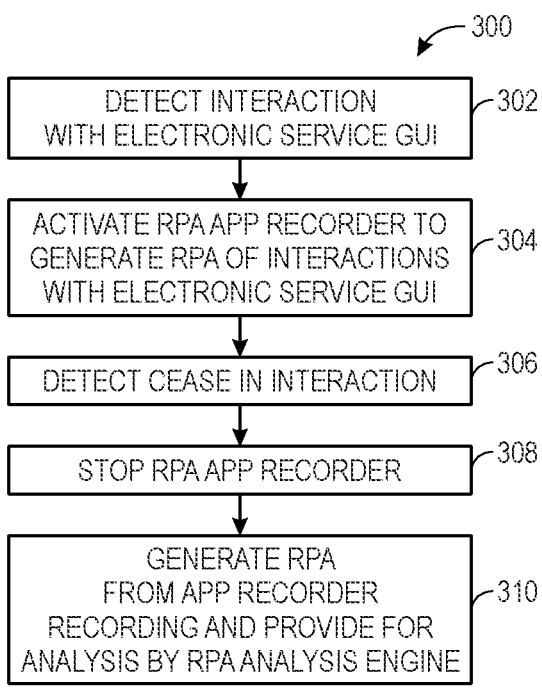
FIG. 3 is a flowchart, illustrating a process for generating RPAs, in accordance with aspects of the present disclosure.

FIG. 2 is a block diagram, illustrating an electronic interacting device 200 that is used to generate RPA scripts for subsequent overlap analysis, in accordance with aspects of the present disclosure. FIG. 3 is a flowchart, illustrating a process 300 for generating RPAs, in accordance with aspects of the present disclosure. For simplicity, these FIGS. will be discussed together.

As illustrated in FIG. 2, the electronic interacting device 200 includes a processor 202 and communications circuitry 204 that enable the electronic interacting device 200 to render an electronic service GUI 208 for interacting 210 with the electronic services 106. For example, the electronic service GUI 208 may be rendered based upon instructions of an app 212 stored in storage 214 of the electronic interacting device 200. In some embodiments, the instructions of the app 212 may depend on data received via the communications circuitry 204.

The process 300 begins by detecting interaction with the electronic service GUI 208 (block 302). For example, the electronic interacting device 200 may monitor for launching the electronic service GUI 208, selection of objects within the electronic service GUI 208, etc. to detect that interaction with the electronic service GUI 208 has occurred.

As illustrated in FIG. 2, the app 212 may include an embedded RPA engine 216. An app interaction RPA recorder of the RPA engine 216 may be activated in response to detected interaction with the electronic service GUI 208 (block 304). This may result in recording of interaction steps in one or more RPA scripts 218 generated by the RPA engine 216.

The RPA engine 216 may detect a cease in interaction (block 306). For example, the cease may be detected when the electronic service GUI 208 is closed by the interactor, a threshold amount of time without interaction (e.g., selection of an object) within the electronic service GUI 208, etc.

In response to detecting the cease in interaction, the recording by the RPA engine 216 may be deactivated (block 308). The recorded interactions may be used to generate an RPA script (block 310). The generated RPA script may be provided for access by the RPA analysis engine 112 for overlap identification against other provided RPA scripts. For example, the RPA script may be submitted to the RPA library 110.

Figure 4:
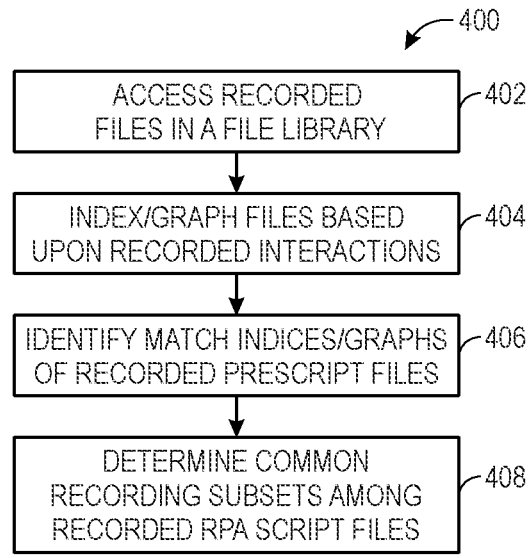
FIG. 4 is flowchart, illustrating a process for determining overlapping functionality in RPAs, in accordance with aspects of the present disclosure.

Having discussed the RPA script generation, the discussion now turns to analysis of the RPA scripts for overlap. FIG. 4 is flowchart, illustrating a process 400 for determining overlapping functionality in RPAs, in accordance with aspects of the present disclosure. The process 400 begins with accessing the RPA scripts with recorded interactions from the RPA library 110 (block 402). The RPA library 110 may be periodically checked to identify additions to the RPA library 110, which may trigger the evaluation process.

As RPA scripts are retrieved, the RPA scripts may be indexed/graphed based upon the recorded interactions (block 404). For example, a digital index may be maintained that provides an indication of function interactions within a particular indexed RPA script. Further, the index may include an indication of ordered sequences of functions corresponding to interactions that are present in the RPA scripts. In some embodiments, graph representations of these function sequences may be maintained for efficient analysis. An example of such graphs may be found in FIG. 6.

After the RPA script is indexed and/or graphed, the index and/or graph is compared with other indices and/or graphs for other RPA scripts to identify matches between the indices and/or graphs of the RPA scripts (block 406).

The commonalities/overlapping functions of the RPA scripts are determined by determining the common recorded subsets among the RPA scripts (block 408). An indication of the commonalities/overlapping functions may be provided for subsequent electronic device use/control.

Figure 5:
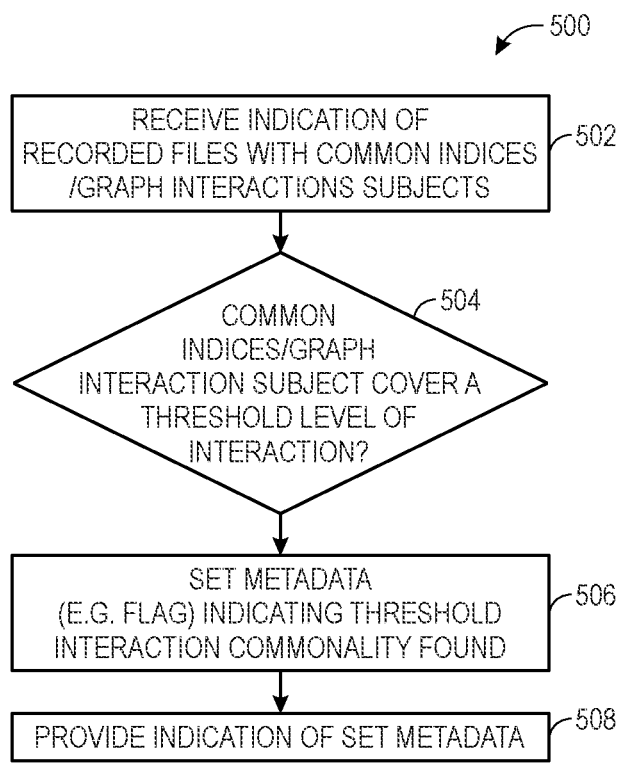
FIG. 5 is a flowchart, illustrating a process for flagging and/or reporting identified overlap from the RPAs, in accordance with aspects of the present disclosure.

FIG. 5 is a flowchart, illustrating a process 500 for flagging and/or reporting identified overlap from the RPAs, in accordance with aspects of the present disclosure. The process 500 begins with receiving an indication of recorded RPA scripts with common/overlapping functions (e.g., common/overlapping indices/graph subsets) (block 502). For example, the indication may be provided as a result of the process 400 of FIG. 4.

In some embodiments, overlaps may be flagged and/or trigger a control action only upon a threshold number of functions in a function sequence overlapping. Thus, in such instances, a determination may be made as to whether the common indices/graph interaction subsets involve a threshold level of interaction (e.g., number of interaction steps) (decision block 504). When the indices/graph interaction subsets do not cover a threshold level of interaction, the process 500 returns to block 502 to continue analysis on other indices/graph interaction subsets.

However, when the indices/graph interaction subsets do cover a threshold level of interaction, metadata (e.g., a flag) may be set indicating a threshold interaction commonality between two or more RPA scripts (block 506). In some embodiments, the metadata may indicate the particular RPA scripts and the particular function sequence of overlap.

An indication of the set metadata (e.g., indicating the overlap) may be provided for subsequent electronic device notification and/or control (block 508). For example, in some embodiments, each time metadata is set, an indication of the set metadata may be provided. In other embodiments, the indication of set metadata may be sent in bulk upon a particular threshold of metadata being set, a particular periodic time interval being reached, etc.

Figure 6:
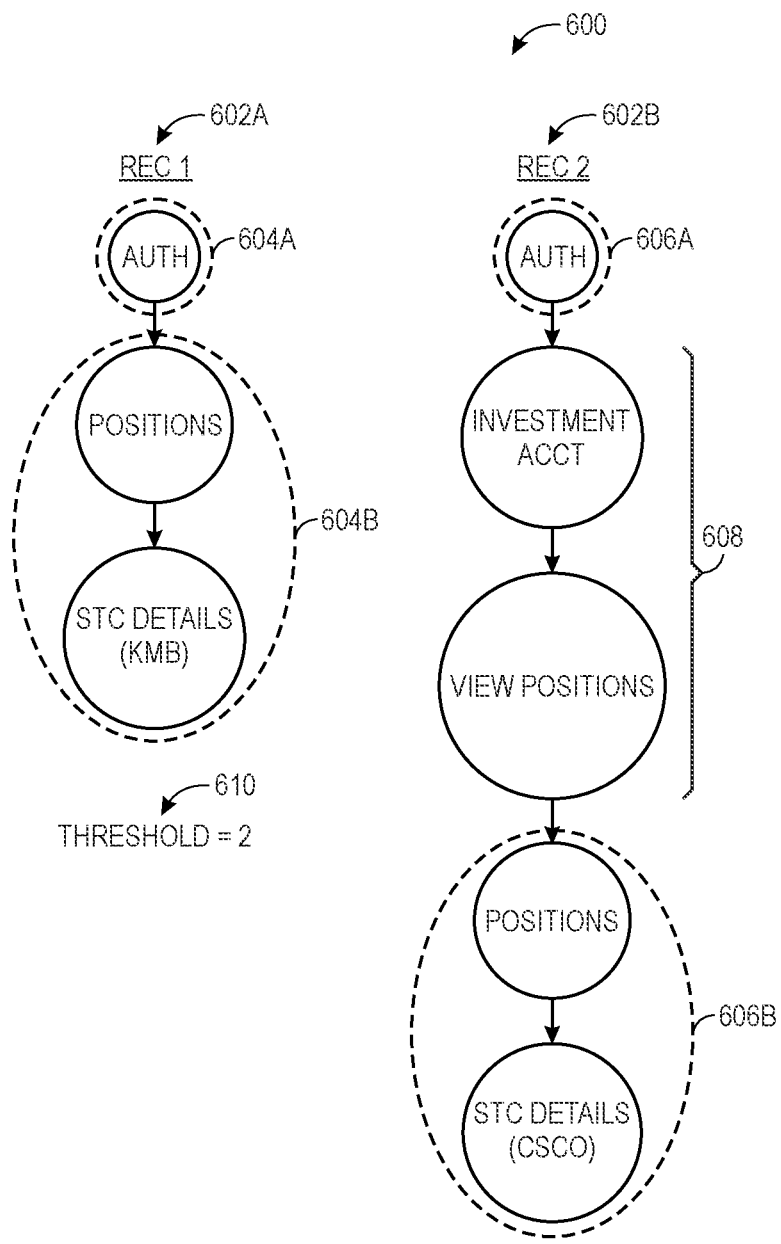
FIG. 6 is a schematic diagram, illustrating graphs from two RPA script recordings, where overlapping functions are identified, in accordance with aspects of the present disclosure.

Turning now to a discussion of the graphs derived from the RPA scripts 108, FIG. 6 is a schematic diagram 600, illustrating graphs 602A and 602B from two RPA script recordings, where overlapping functions (e.g., as indicated by dashed lines 604A and 604B and corresponding dashed lines 606A and 606B) are identified, in accordance with aspects of the present disclosure. As mentioned above, the RPA analysis engine 112 may identify common functions in RPA script recordings and make note of the overlaps. In the current example, graph 602A includes an "AUTH" function, as does graph 602B. This commonality/overlap in functionality is identified and noted (e.g., in a data store) as represented by dashed lines 604A and corresponding dashed lines 606A.

Further, the RPA analysis engine 112 identifies and notes a function sequence subset overlap of "POSITIONS"→"STC DETAILS" found in both graph 602A and 602B, as indicated by dashed lines 604B and corresponding dashed lines 606B. Further, as illustrated, in graphs 602A and 602B, different parameters were used with the STC DETAILS function (e.g., looking up stock KMB vs stock CSCO). However, this does not hinder identifying this function as an overlap, as RPAs can adjust parameters/variables during execution.

Functions 608 in graph 602B are intervening functions between a first common function (e.g., "AUTH") and second other common functions (e.g., "POSITIONS" or "POSITIONS"→"STC DETAILS"). As may be appreciated, the graph 602A indicates that navigation through these intervening functions 608. Accordingly, based upon a comparison of the graphs 602A and 602B, the RPA analysis engine 112 may identify a more efficient path between the first common function and the second other functions.

Figure 7:
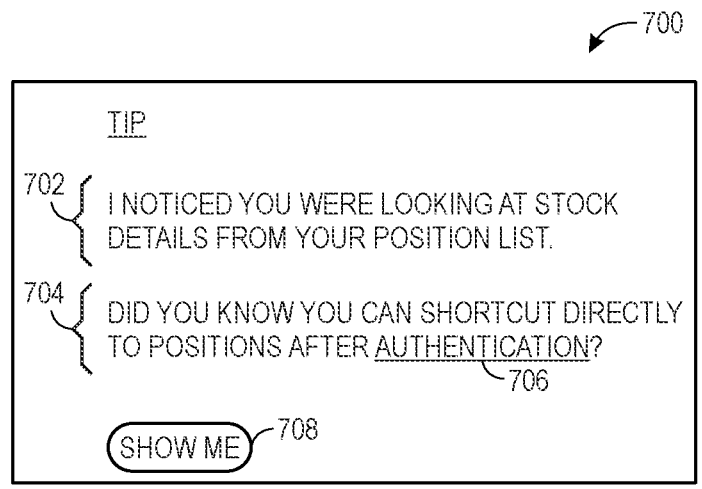
FIG. 7 is a schematic diagram, illustrating a graphical user interface (GUI) providing an alert of the identified overlapping function(s) and a proposal to provide a more efficient path to one or more of the overlapping functions, by way of presenting a more efficient (e.g., less navigational step) RPA to the overlapping functions, in accordance with aspects of the present disclosure.

FIG. 7 is a schematic diagram, illustrating a graphical user interface (GUI) 700 providing an alert of the identified overlapping function(s) and a proposal to provide a more efficient path to one or more of the overlapping functions, by way of presenting a more efficient (e.g., less navigational step) RPA to the overlapping functions, in accordance with aspects of the present disclosure. Here, the GUI 700 provides an indication 702 of the second other common overlapping functions (e.g., in a more descriptive form than the name provided in the graphs 602A and 602B). Further, a suggestion 704 of a more efficient route to the second other common functions is provided, indicating the shortcut from the first common function 706.

As mentioned above, RPA scripts may automate interactions with an electronic service when executed. This may be useful in showing a user the more efficient route to the other common functions. For example, in the illustrated example, the "SHOW ME" affordance 708, when selected, may launch the RPA script associated with graph 602A (e.g., the script illustrating the more-efficient path), using the parameters from the graph in 602B. In this manner, the interactor may be able to see the interactions that cause navigation along the more-efficient path.

Figure 8:
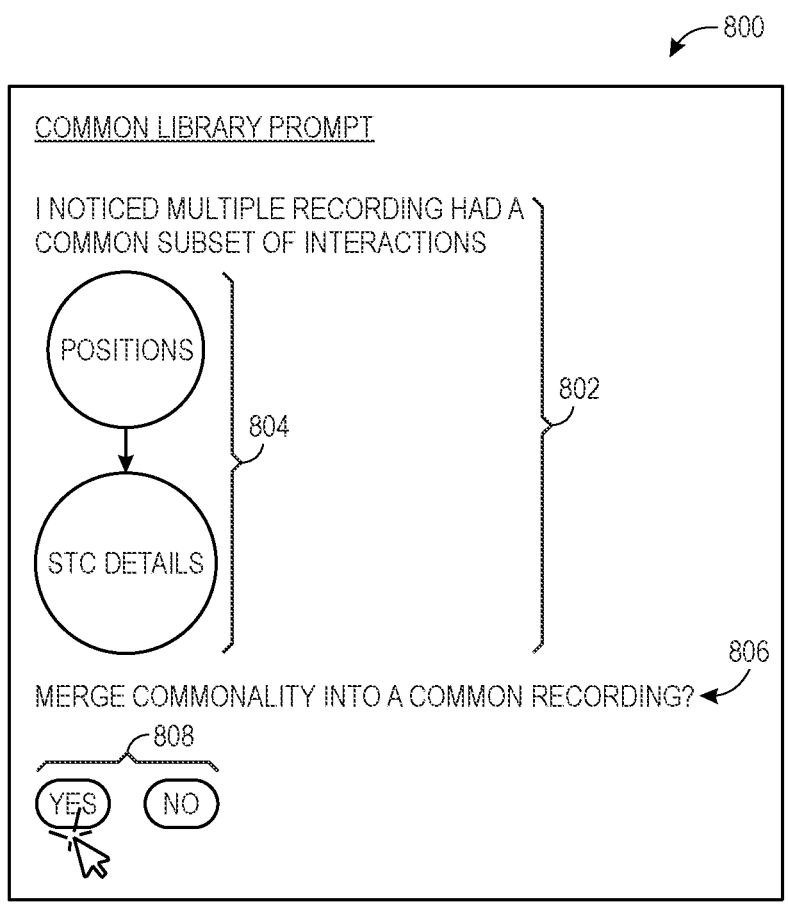
FIG. 8 is schematic diagram, illustrating a GUI providing an alert of the identified overlapping function(s) and a proposal to merge the commonality (e.g., the overlapping functions) into a common code that is used by a plurality of codebases, in accordance with aspects of the present disclosure.

As mentioned above, thresholds may be used to identify when to notify or suggest merging of overlapping function subsets. For example, the indicator 610 of FIG. 6 indicates that notifications and/or suggestions to merge overlapping functions should occur when a sequential sequence of two or more overlapping functions are found. FIG. 8 is schematic diagram, illustrating a GUI 800 providing an alert 802 of the identified overlapping function(s) 804 and a proposal 806 to merge the commonality (e.g., the overlapping functions) into a common code that is used by a plurality of codebases, in accordance with aspects of the present disclosure. As illustrated, the "AUTH" commonality is not presented, as this does not meet the two or more sequential sequence of overlapping functions. However, the POSITIONS→STC DETAILS sequence does meet the two or more threshold and is, thus, presented in the GUI 800.

Figure 9:
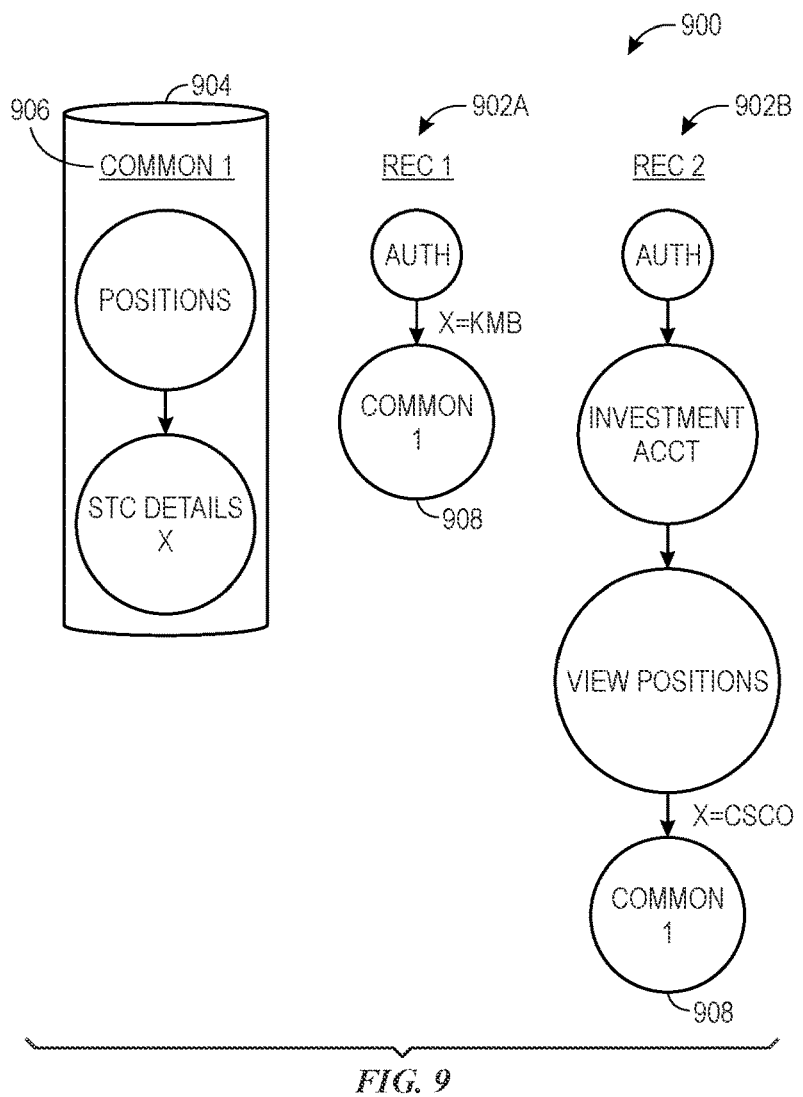
FIG. 9 is a schematic diagram, illustrating restructured RPA scripts from the original RPA scripts of FIG. 6, the restructured RPA scripts removing duplicative functions, in accordance with aspects of the present disclosure.

Along with the proposal 806, there are one or more affordances 808, enabling the interactor to choose whether or not to merge the common sequence into a common recording/codebase. FIG. 9 is a schematic diagram 900, illustrating restructured RPA scripts 902A and 902B from the original RPA scripts 602A and 602B of FIG. 6.

Upon a selection of the affordance 808 of FIG. 8, indicating that the common sequence should be merged, the common sequence is moved from the RPA scripts 902A and 902B including the common sequence to a common sequence datastore 904. The common sequence is given a key 906 (e.g., "COMMON 1") that is associated with the common sequence is in the common sequence datastore 904.

The common sequence is replaced with a pointer to the common sequence in the common sequence datastore 904. For example, a function call 908 referring to the key 906 may be inserted in place of the common sequence. As may be appreciated, this may reduce a storage use, as only one version of the common sequence needs to be stored. Further, when changes need to be made to the common sequence, the changes only need to be made in one location. For example, if a new intermediate step was introduced in the electronic service between "POSITIONS" and "STC DETAILS", both RPA scripts associated with graphs 902A and 902B would be updated upon updating the common sequence in the common sequence datastore 904.

While the current discussion of FIGS. 8 and 9 deal with merging portions of RPA scripts into a common sequence, the same concept could apply to codebases as well. For example, as mentioned with regard to FIG. 1, the RPA analysis engine may store common code in a common code repository upon indication to merge overlapping functionality. The codebases for the electronic services may then be updated to remove the portion of the codebases applicable to the common sequence, replacing the codebase with a pointer to the common codebase in the common codebase datastore.

Figure 10:
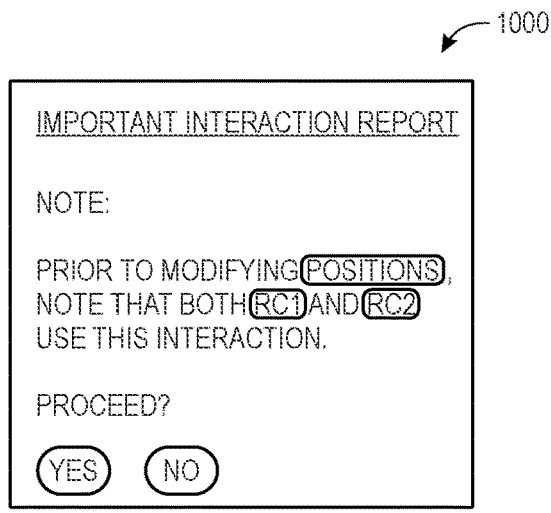
FIG. 10 is a schematic diagram, illustrating a GUI providing an alert of an important interaction, in accordance with aspects of the present disclosure.

Having discussed the merging of duplicative functions/code, the discussion now proceeds to providing an indication of impacts that code changes will incur, as indicated by the identified overlaps. FIG. 10 is a schematic diagram, illustrating a GUI 1000 providing an alert of important interactions associated with a pending modification of a codebase. In the current example, a developer is attempting to modify the "POSITIONS" function. Prior to appending the modifications, the GUI 1000 may provide an indication that a number of RPA scripts (e.g., ones associated with 602A and 602B) will be impacted by the change. As mentioned above, the RPA analysis engine 112 may make note of all overlapping functions in the RPAs. These notations may be used to identify RPA scripts that will be affected by changes to a particular function.

In some instances, the RPA analysis engine 112 may predict breakage of an RPA script based upon modifications to a particular function. For example, if a modification to the POSITIONS function included removing an object that the RPA scripts use to navigate to the STC DETAILS function in a sequence of functions, the GUI 1000 may provide an indication that the modification will break the sequence of functions (e.g., as there may not be a known way to get to STC DETAILS from POSITIONS). This may provide an indication to the developer that the RPA scripts need to be updated with a new navigation and/or that the removal of the object should not occur.

By employing robotic process automation, IT infrastructure may be enhanced, by providing notifications of overlapping functionality (e.g., that may provide an indication of more efficient pathways and/or provide a better indication of impacts of modification of the overlapping functionality). Further, resource utilization and spend may be more-efficiently implemented. Additionally, IT storage costs may be reduced. The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A non-transitory computer-readable medium, comprising computer-executable instructions that, when executed by one or more processors, cause the one or more processors to:
retrieve two or more robotic process automation (RPA) scripts;
compare the two or more RPA scripts to identify an overlap of functions in the two or more RPA scripts; and
based upon the overlap of functions, provide a notification of the overlap of functions, merge the overlap of functions into a common functions library, removing the overlap of functions from the two or more RPA scripts, or both;
wherein the two or more RPA scripts are generated automatically via an RPA engine independent of a command by an interactor to start recording interactions of the two or more RPA scripts, by the RPA engine:
detecting interaction with an electronic service graphical user interface (GUI);
in response to detecting the interaction with the electronic service GUI, activating an RPA recorder to capture interactions with the service GUI made while the RPA recorder is activated;
detect a cease in interaction with the electronic service GUI;
based upon the cease in interaction, deactivate the RPA recorder; and
generate each of the two or more RPA scripts based upon the captured interactions.

2. The non-transitory computer-readable medium of claim 1, comprising computer-executable instructions that, when executed by the one or more processors, cause the one or more processors to:
compare the two or more RPA scripts to identify the overlap, by:
generating graphs for each of the two or more RPA scripts; and
traversing the graphs to identify common nodes of the graphs, the common nodes representative of the overlap of functions.

3. The non-transitory computer-readable medium of claim 1, wherein the two or more RPA scripts are generated automatically via an RPA engine independent of a command by an interactor to start recording interactions of the two or more RPA scripts.

4. The non-transitory computer-readable medium of claim 3, wherein the two or more RPA scripts are generated automatically via an RPA engine, by the RPA engine:
detecting interaction with an electronic service graphical user interface (GUI);
in response to detecting the interaction with the electronic service GUI, activating an RPA recorder to capture interactions with the service GUI made while the RPA recorder is activated;
detect a cease in interaction with the electronic service GUI;
based upon the cease in interaction, deactivate the RPA recorder; and
generate each of the two or more RPA scripts based upon the captured interactions.

5. The non-transitory computer-readable medium of claim 1, comprising computer-executable instructions that, when executed by the one or more processors, cause the one or more processors to:
index the two or more RPA scripts based upon recorded interactions contained within the two or more RPA scripts; and
identify the overlap of functions in the two or more RPA scripts based upon indices of the indexed two or more RPA scripts.

6. The non-transitory computer-readable medium of claim 1, comprising computer-executable instructions that, when executed by the one or more processors, cause the one or more processors to:
determine a subset of the overlap of functions in the two or more RPA scripts that comprises a sequential sequence of functions that breaches a pre-defined threshold number of functions; and
provide a notification of the subset of the overlap of functions, while refraining from providing a notification of the overlap of functions outside of the subset.

7. The non-transitory computer-readable medium of claim 6, comprising computer-executable instructions that, when executed by the one or more processors, cause the one or more processors to:
provide a proposal to merge the subset of the overlap into a common datastore.

8. The non-transitory computer-readable medium of claim 7, comprising computer-executable instructions that, when executed by the one or more processors, cause the one or more processors to:
receive an indication to accept the proposal; and based upon receiving the indication to accept the proposal:
   move the subset of the overlap from the two or more RPA scripts into the common datastore, associating the subset of the overlap with a key in the common datastore; and
   in lieu of the moved subset of the overlap in the two or more RPA scripts, insert a pointer to the subset of the overlap in the common datastore, using the key.

9. The non-transitory computer-readable medium of claim 1, comprising computer-executable instructions that, when executed by the one or more processors, cause the one or more processors to:
   identify a first overlap in the overlap of functions in the two or more RPA scripts;
   identify a second overlap in the overlap of functions in the two or more RPA scripts;
   identify intervening functions between the first overlap and the second overlap in a first one of the two or more RPA scripts that are not in a second one of the two or more RPA scripts; and
   based upon identifying the intervening functions, provide a notification that a more-efficient path to the second overlap exists.

10. The non-transitory computer-readable medium of claim 9, comprising computer-executable instructions that, when executed by the one or more processors, cause the one or more processors to:
   provide, in the notification, an indication that the more-efficient path comprises removal of the intervening functions.

11. The non-transitory computer-readable medium of claim 9, comprising computer-executable instructions that, when executed by the one or more processors, cause the one or more processors to:
   provide, with the notification, an affordance that, when selected, triggers a visual indication of executing the more-efficient path; and
   upon selection of the affordance, execute the second of the two or more RPA scripts using parameters of the first one of the two or more RPA scripts.

12. The non-transitory computer-readable medium of claim 1, comprising computer-executable instructions that, when executed by the one or more processors, cause the one or more processors to:
   detect a pending modification to a function;
   identify each of the two or more RPA scripts that include the function, based upon the overlap of functions in the two or more RPA scripts
   provide a notification indicating each of the two or more RPA scripts that include the function, indicating that they will be affected by the pending modification.

13. A computer-implemented method, comprising:
   retrieving two or more robotic process automation (RPA) scripts;
   comparing the two or more RPA scripts to identify an overlap of functions in the two or more RPA scripts; and
   based upon the overlap of functions, providing a notification of the overlap of functions, merge the overlap of functions into a common functions library, removing the overlap of functions from the two or more RPA scripts, or both;
   wherein the two or more RPA scripts are generated automatically via an RPA engine independent of a command by an interactor to start recording interactions of the two or more RPA scripts, by the RPA engine:
   detecting interaction with an electronic service graphical user interface (GUI);
   in response to detecting the interaction with the electronic service GUI, activating an RPA recorder to capture interactions with the service GUI made while the RPA recorder is activated;
   detect a cease in interaction with the electronic service GUI;
   based upon the cease in interaction, deactivate the RPA recorder; and
   generate each of the two or more RPA scripts based upon the captured interactions.

14. The computer-implemented method of claim 13, comprising:
   comparing the two or more RPA scripts to identify the overlap, by:
      generating graphs for each of the two or more RPA scripts; and
      traversing the graphs to identify common nodes of the graphs, the common nodes representative of the overlap of functions.

15. The computer-implemented method of claim 13, comprising:
   determining a subset of the overlap of functions in the two or more RPA scripts that comprises a sequential sequence of functions that breaches a pre-defined threshold number of functions;
   providing a notification of the subset of the overlap of functions, while refraining from providing a notification of the overlap of functions outside of the subset; and
   providing a proposal to merge the subset of the overlap into a common datastore.

16. The computer-implemented method of claim 15, comprising:
   receiving an indication to accept the proposal; and
   based upon receiving the indication to accept the proposal:
      moving the subset of the overlap from the two or more RPA scripts into the common datastore, associating the subset of the overlap with a key in the common datastore; and
      in lieu of the moved subset of the overlap in the two or more RPA scripts, inserting a pointer to the subset of the overlap in the common datastore, using the key.

17. The computer-implemented method of claim 13, comprising:
   identifying a first overlap in the overlap of functions in the two or more RPA scripts;
   identifying a second overlap in the overlap of functions in the two or more RPA scripts;
   identifying intervening functions between the first overlap and the second overlap in a first one of the two or more RPA scripts that are not in a second one of the two or more RPA scripts;
   based upon identifying the intervening functions, providing a notification that a more-efficient path to the second overlap exists;
   providing, in the notification, an indication that the more-efficient path comprises removal of the intervening functions;
   providing, with the notification, an affordance that, when selected, triggers a visual indication of executing the more-efficient path; and upon selection of the affordance, executing the second of the two or more RPA scripts using parameters of the first one of the two or more RPA scripts.

18. A system, comprising:
a robotic process automation (RPA) library configured to store a plurality of RPA scripts;
an interaction electronic device, configured to:
   detect interactions with an app that facilitates interactions with an electronic service;
   based upon detecting the interactions with the app, record interactions with the electronic service, by activating an RPA recorder, embedded within the app, that records the interactions with the electronic service;
   detect ceasing of the interactions with the electronic service;
   based upon detecting the ceasing, deactivate the RPA recorder;
   generate an RPA script based upon the recorded interactions with the electronic service; and
   provide the RPA script to the RPA library for storage;
an RPA analysis engine, configured to:
   access the plurality of RPA scripts stored in the RPA library;
   compare the plurality of RPA scripts against one another to identify an overlap of functions in the plurality of RPA scripts; and
   based upon the overlap of functions, provide a notification of the overlap of functions, merge the overlap of functions into a common functions library, removing the overlap of functions from the plurality of RPA scripts, or both.

19. The system of claim 18, wherein the RPA analysis engine is configured to:
   identify a first overlap in the overlap of functions in the plurality RPA scripts;
   identify a second overlap in the overlap of functions in the plurality of RPA scripts;
   identify intervening functions between the first overlap and the second overlap in a first one of the plurality of RPA scripts that are not in a second one of the plurality of RPA scripts;
   based upon identifying the intervening functions, providing a notification that a more-efficient path to the second overlap exists;
   providing, in the notification, an indication that the more-efficient path comprises removal of the intervening functions;
   providing, with the notification, an affordance that, when selected, triggers a visual indication of executing the more-efficient path; and
   upon selection of the affordance, executing the second of the plurality of RPA scripts using parameters of the first one of the plurality of RPA scripts.

* * * * *